Oct. 22, 1968   J. KONRAD ET AL   3,407,303
PHOTOELECTRIC APPARATUS FOR DETERMINING THE HEIGHT
OF A STACK UTILIZING AMBIENT LIGHT
Filed Nov. 8, 1965

Inventors
Josef Konrad
Siegfried Nissler
by Michael J. Striker

United States Patent Office 3,407,303
Patented Oct. 22, 1968

3,407,303
PHOTOELECTRIC APPARATUS FOR DETERMINING THE HEIGHT OF A STACK UTILIZING AMBIENT LIGHT
Josef Konrad, Oberaichen, and Siegfried Nissler, Echterdingen, Wurttemberg, Germany, assignors to Weitmann & Konrad, Echterdingen, Wurttemberg, Germany
Filed Nov. 8, 1965, Ser. No. 506,762
Claims priority, application Germany, Nov. 12, 1964, W 37,946
15 Claims. (Cl. 250—222)

The present invention relates to apparatus for determining the height of a stack. More particularly, the invention relates to apparatus for determining the height of a stack in ambient light relative to first and second heights. The apparatus produces a control signal when the stack is at a selected determined height and the control signal may be utilized with suitable apparatus to increase or to decrease the height of the stack in accordance with whether the height of the stack at the selected determined height is lower or higher than a desired height.

Light sensitive apparatus is utilized to determine and control the height of a stack of stackable materials such as, for example, paper, parcels, packages, units of material and the like. The stackable materials may be stacked in accordance with a machine operation or in individual packing operations. The stackable materials may be stacked or unstacked prior to an operation involving them. The height of the stack must be maintained at a desired level above the support surface supporting the stack. In known apparatus, a light source is utilized with a light sensitive cell or device which responds to the artificial light produced by the light source. The light source and light sensitive device are positioned at a determined height above the surface and the light received by the device from the source produces a specific type of reaction by said light sensitive device. When the stack reaches the determined height, it is interposed between the light source and the light sensitive device so that said stack reduces the light received by said device from said source and the reaction of the light sensitive source differs from its previous reaction. The different reaction of the light sensitive device controls apparatus which operates to remove stackable materials from the stack until the height of the stack is decreased to the determined height.

Known types of light sensitive apparatus for determining and controlling the height of a stack function either by direct receipt of light by the light sensitive device from the source of light or by receipt of light produced by the light source and reflected by the stack. The direct light receipt apparatus functions in the aforedescribed manner, in which the stack is interposed between the light source and the light sensitive device. Such apparatus must be properly adjusted in light transmission and sensitivity and in the height of the light source and light sensitive device above the support surface. If the lamp utilized as the light source becomes defective, the determination of the stack height is erroneous and thus the control of the stack height is erroneous. Furthermore, stray units of stackable material may prevent the light from the light source from reaching the light sensitive device for a period which is long enough to produce an erroneous determination.

The reflected light receipt apparatus utilizes a light source and a light sensitive device which are positioned adjacent each other relative to the stack in a manner whereby light produced by the light source is incident on the stack, which reflects such light to the light sensitive device. The stackable materials must reflect light strongly and the apparatus will not function with stackable materials which reflect light weakly. Also, as in the direct light receipt apparatus, stray units of stackable material may produce an erroneous determination. The light source utilizes a lamp with a limited life, which is subject to malfunction, so that it requires replacement. Furthermore, the apparatus may produce an erroneous determination if dust settles on the stackable materials or on the light-receiving surface of the light sensitive device, or if light other than that produced by the source of light is received by the light sensitive device.

The principal object of the present invention is to provide a new and improved apparatus for determining the height of a stack.

An object of the present invention is to provide apparatus for determining the height of a stack which utilizes ambient light instead of a specific source of light.

Another object of the present invention is to provide apparatus for determining the height of a stack which is very simple in structure and is almost completely free from the need for repair.

Another object of the present invention is to provide apparatus for determining the height of a stack which is accurate and reliable in operation.

Another object of the present invention is to provide apparatus for determining the height of a stack which is accurate and reliable in operation regardless of the light reflecting characteristics of the stackable materials.

In accordance with the present invention, apparatus for determining the height above a surface of a stack in ambient light relative to first and second determined heights above the surface, the second determined height being greater than the first determined height, comprises light sensitive means positioned in proximity with the first and second determined heights to receive ambient light adjacent the stack whereby as the stack rises above the first determined height toward the second determined height it correspondingly proportionally prevents ambient light from reaching the light sensitive means and as the stack decreases below the second determined height toward the first determined height it correspondingly proportionaly permits ambient light to reach the light sensitive means. The light sensitive means produces electrical signals having magnitudes which vary with the amount of ambient light reaching the light sensitive means. Control means electrically connected to the light sensitive means derives from the electrical signals a control signal when the stack is at a selected determined height. A housing having a pair of substantially coplanarly positioned translucent windows houses the light sensitive means which may comprise a pair of photocells each positioned at a corresponding one of the windows. The control comprises an electrical bridge circuit having a plurality of branches, a diagonal connection and variable resistance means, one of the photocells being connected in one of the branches, the other of the photocells being connected in another of the branches, the variable resistance means being connected in branches other than those in which the photocells are connected for balancing the electrical bridge circuit in a desired manner and the control signal being provided in the diagonal connection.

In order that the present invention may be readily carried into effect it will now be described with reference to the accompanying drawing, wherein.

In the figures, the same components are identified by the same reference numerals.

Figure 1:
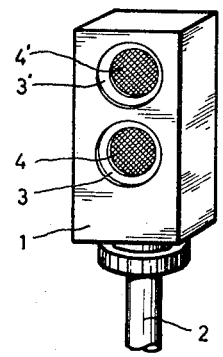
FIG. 1 is a perspective view of an embodiment of the housing of the apparatus of the present invention.
Figure 2:
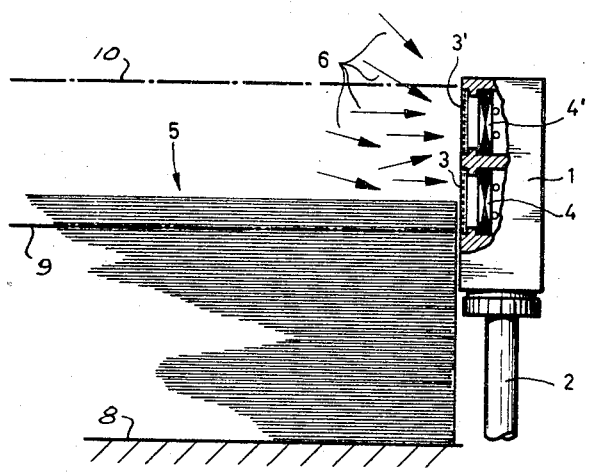
FIG. 2 is a side view, partly in section, of the embodiment of FIG. 1 in proximity with a stack the height of which is to be determined.

In FIGS. 1 and 2, a housing 1 is supplied with a multiconductor electrical cable 2 which extends into said housing and is affixed thereto by any suitable means. The housing 1 is opaque to light, except for a pair of substantially coplanarly positioned translucent windows 3 and 3'. A pair of light sensitive devices such as, for example, photocells, photoresistors, phototransistors, or the like, 4 and 4' are positioned in the housing 1, the photocell 4 being positioned at the window 3 and the photocell 4' being positioned at the window 3'. The photocells 4 and 4' are connected to electrical conductors which are included in the cable 2 and which may connect said photocells in the manner of the control circuit of FIG. 3. Both photocells 4 and 4' may be positioned in substantially coplanar relation at a single window large enough to accommodate them.

The stackable materials such as, for example, sheets of paper 5 are stacked on a surface 8 which supports the stack. The support surface 8 may support the housing 1 or the housing 1 may be supported on another surface. The apparatus of the present invention functions to determine the height above the surface 8 of the stack 5 in ambient light 6 relative to first and second determined heights 9 and 10, respectively, above the support surface 8. The second determined height 10 is greater than the first determined height 9. The first and second determined heights are utilized only in reference purposes and may comprise any suitable different heights above the support surface 8.

The first and second determined heights 9 and 10 serve as adjustment levels for the photocells 4 and 4' so that they provide one type of signal, in one instance, when the stack 5 is below a selected determined height and another type of signal when the stack 5 is at and/or above the selected determined height, and in another instance, they provide one type of signal when the stack 5 is above a selected determined height and another type of signal when the stack 5 is at and/or below the selected determined height.

The selected determined height may be any height between the first and second determined heights 9 and 10 and may be either the first determined height 9 or the second determined height 10. The ambient light 6 is the usual, customary, ordinary, or the like light of the area or vicinity of the stack 5. The photocells 4 and 4' in their housing 1 are positioned in proximity with the first and second determined heights 9 and 10 to receive ambient light 6 adjacent the stack 5.

As the stack 5 rises above the first determined height 9 toward the second determined height 10, it correspondingly proportionally prevents ambient light 6 from reaching the photocells 4 and 4'. If the stack 5 were initially at or higher than the second determined height 10 or even lower than such second determined height and decreases below the second determined height toward the first determined height 9, it correspondingly permits ambient light 6 to reach the photocells 4 and 4'. The photocells 4 and 4' produce electrical signals having magnitudes which vary with the amount of ambient light reaching said photocells.

The housing 1 may abut the stack 5 with its windowed surface, or it may be spaced a small distance with the stack. The light sensitive devices may comprise photoresistors 14 and 14' (FIG. 3) which vary in electrical resistance in accordance with the amount or intensity of light impinging upon them. The resistance of each photoresistor 14 and 14' may decrease proportionally or in a determined relation with light impinging on the photoresistor.

A control circuit 11 is electrically connected to the light sensitive devices 4 and 4' or 14 and 14' and functions to derive from the electrical signals produced by the light sensitive devices a control signal when the stack 5 is at a selected determined height. If photocells 4 and 4' are utilized, their outputs are connected in the control circuit 11. If photoresistors 14 and 14' are utilized they are themselves connected in the control circuit 11.

Figure 3:
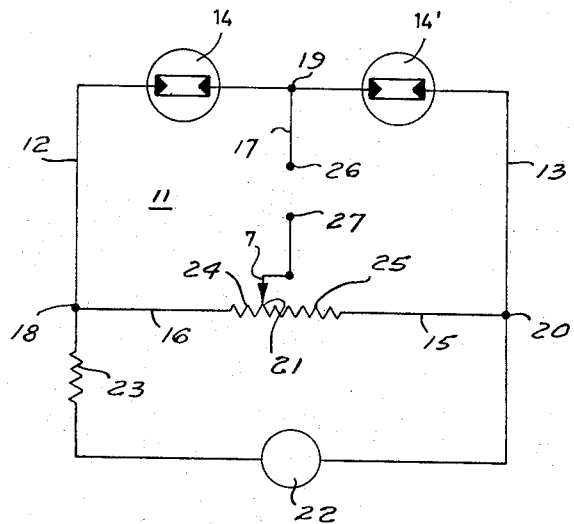
FIG. 3 is a circuit diagram of an embodiment of the control circuit of the apparatus of the present invention.

The control circuit 11, as shown in FIG. 3, comprises an electrical bridge circuit having four branches 12, 13, 15 and 16 and a diagonal connection 17. The bridge has four joiner points 18, 19, 20 and 21, and is energized by a suitable source of voltage 22 connected to its joiner points 18 and 19 via a resistor 23. A variable resistor 24 is connected in the branch 16 between the joiner points 18 and 21. A variable resistor 25 is connected in the branch 15 between the joiner points 20 and 21. One of the photoresistors 14 is connected in the branch 12 between the joiner points 18 and 19 and the other of the photoresistors 14' is connected in the branch 13 between the joiner points 19 and 20. The variable resistors 24 and 25 may be parts of a single variable resistor, as shown, having a top 7 which provides the joiner point 21 at its connection with the resistor.

The control signal is provided at the terminals 26 and 27 of the diagonal connection 17, and may be utilized in any suitable manner to perform any suitable function. The control signal may thus be utilized, as desired, to operate an alarm when it has a predetermined magnitude, or to add stackable materials to the stack 5 via suitable components such as, for example, a relay and a hopper controlled by the relay when it has a predetermined magnitude, or to remove stackable materials from the stack 5 via suitable components such as, for example, a vacuum device and a switch controlling the vacuum device when it has a predetermined magnitude.

The electrical bridge is balanced in a symmetrical or asymmetrical manner by means of the variable resistors 24, 25 thereby determining at what magnitude the control signal provided at the terminals 26 and 27 will provide a desired function. The adjustment-selected control signal magnitude corresponds to the selected determined height of the stack. The resistor 23 functions as a regulator of the energizing voltage applied to the bridge from the voltage source 22.

In the embodiment of FIGS. 1 and 2, one of the photocells 4 and 4' may function as a control or determining device while the other functions as a reference or environmental adjusting device. In the embodiment of FIG. 3, difference in current flowing through the photoresistors 14 and 14' may be utilized to provide the control signal at the terminals 26 and 27. One of the photoresistors such as, for example, the photoresistor 14', which is presumed to be positioned higher than the photoresistor 14, may function as a reference or environmental adjusting device. In such case, the photoresistor 14' is not prevented by the stack 5 from receiving ambient light 6 at any time and indicates the ambient light intensity. The utilization of one of the photoresistors as a reference device increases the sensitivity of the apparatus by a factor of 10 independently of the intensity of the ambient light 6. This prevents a stray unit of stackable material from producing an erroneous control signal which in turn would produce an erroneous raising or lowering of the stack height.

The bridge may be adjusted by adjustment of the variable resistors 24 and 25, so that when each of the determining photoresistor 14 and the reference photoresistor 14' received the same intensity of light, a zero magnitude control signal is provided at the terminals 26 and 27. This constitutes symmetrical adjustment of the bridge. If the height of the stack 5 is desired to remain at or above the second determined height 10, or below the first determined height 9, the zero control signal would not be utilized to perform a control function. If the height of the stack 5 is desired to remain below the second determined height 10, but above the first desired height 9, the zero control signal would be utilized to perform a control function. The control function would comprise adding or removing stackable materials to or from the stack 5, dependent upon the initial condition of the stack height.

The bridge may also be adjusted by adjustment of the variable resistors 24 and 25, so that when each of the determining photoresistor 14 and the reference photoresistor 14' receives the same intensity of light, a control signal moving a magnitude different from zero is provided at the terminals 26 and 27. This constitutes asymmetrical adjustment of the bridge. In this case, the bridge may be adjusted so that when the determining photoresistor 14 is completely prevented by the stack 5 from receiving ambient light 6, the bridge will be balanced and the magnitude of the control signal will decrease to zero or to a magnitude which is too small to perform a control function such as, for example, adding to or removing from the stack 5 stackable materials.

Asymmetrical adjustment of the bridge prevents operation when there is no ambient light such as when the area or vicinity of the apparatus is dark. The apparatus of the invention thus has an automatic safety factor when it is so adjusted. If phototransistors or other photosensitive devices are utilized, the polarity connections of the bridge circuit may have to be changed accordingly, so that the bridge will function to provide a control signal in the aforedescribed manner.

It is preferable to position the housing 1 with the windows 3 and 3' as close to the stack 5 as possible and even in abutment with said stack. This provides the most accurate control by the stack 5 of the ambient light 6 impinging upon the photoresponsive devices 4 and 4'. If the windows 3 and 3' are in abutment with the stack 5, the stack may prevent dust from forming on the windows.

The apparatus of the present invention thus completely eliminates the need for a source of artificial light and functions solely on ambient light. The apparatus of the present invention need not be utilized for stack height control, but may be utilized for any suitable control functions such as, for example, the control of a level of liquid or material, the control of goods on a moving conveyor, the counting of goods on a moving conveyor, or the like.

While the invention has been described by means of specific examples and in specific embodiments, we do not wish to be limited thereto, for obvious modifications will occur to those skilled in the art without departing from the spirit and scope of the invention.

What we claim is:

1. Apparatus for determining the height above a surface of a stack in ambient light relative to first and second determined heights above said surface, said second determined height being greater than said first determined height, said apparatus comprising light sensitive means positioned in proximity with said first and second determined heights to receive ambient light adjacent said stack whereby as said stack rises above said first determined height toward said second determined height it correspondingly proportionally prevents ambient light from reaching said light sensitive means and as said stack decreases below said second determined height toward said first determined height it correspondingly proportionally permits ambient light to reach said light sensitive means, said light sensitive means producing electrical signals having magnitudes which vary with the amount of ambient light reaching said light sensitive means; and control means electrically connected to said light sensitive means for deriving from said electrical signals a control signal when said stack is at a selected determined height.

2. Apparatus as claimed in claim 1, further comprising a housing having a translucent window and wherein said light sensitive means is positioned in said housing at said window.

3. Apparatus as claimed in claim 1, further comprising a housing having a pair of substantially coplanarly positioned translucent windows and wherein said light sensitive means comprises a pair of light sensitive devices in said housing each positioned at a corresponding one of said windows.

4. Apparatus as claimed in claim 2, wherein said housing is positioned with its window positioned abutting said stack.

5. Apparatus as claimed in claim 3, wherein said housing is positioned with its windows positioned abutting said stack.

6. Apparatus as claimed in claim 3, wherein said control means comprises an electrical bridge circuit having a plurality of branches and a diagonal connection, one of said light sensitive devices being connected in one of said branches and the other of said light sensitive devices being connected in another of said branches, said control signal being provided in said diagonal connection.

7. Apparatus as claimed in claim 6, wherein said electrical bridge circuit includes variable resistance means connected in branches other than those in which said light sensitive devices are connected for balancing said electrical bridge circuit in a desired manner.

8. Apparatus as claimed in claim 7, wherein said variable resistance means is variable to balance said electrical bridge circuit in a symmetrical manner.

9. Apparatus as claimed in claim 7, wherein said variable resistance means is variable to balance said electrical bridge circuit in an asymmetrical manner.

10. Apparatus as claimed in claim 7, further comprising a housing having a pair of substantially translucent windows and wherein each of said light sensitive devices comprises a photocell positioned at a corresponding one of said windows.

11. Apparatus as claimed in claim 7, further comprising a housing having a pair of substantially translucent windows and wherein each of said light sensitive devices comprises a photoresistor positioned at a corresponding one of said windows.

12. Apparatus as claimed in claim 11, wherein one of the windows of said housing is positioned at a height greater than the other.

13. Apparatus as claimed in claim 11, wherein said housing is positioned with its windows positioned abutting said stack.

14. Apparatus as claimed in claim 11, wherein one of said photoresistors functions as reference device to indicate the ambient light intensity and the other of said photoresistors functions to determine the height of said stack.

15. Apparatus as claimed in claim 10, wherein one of said photocells functions as reference device to indicate the ambient light intensity and the other of said photocells functions to determine the height of said stack.

References Cited

UNITED STATES PATENTS

| | | | |
|---|---|---|---|
| Re. 20,823 | 8/1938 | Goodwin | 250—210 X |
| 2,117,878 | 5/1938 | Friedemann. | |
| 2,366,152 | 12/1944 | Lauterbach | 250—222 X |
| 2,525,311 | 10/1950 | Peyrebrune | 250—221 X |
| 2,883,559 | 4/1959 | Bailey. | |
| 2,894,147 | 7/1959 | Stidwill | 250—222 X |
| 3,229,102 | 1/1966 | Spencer et al. | 250—210 X |
| 3,232,547 | 2/1966 | Thiede et al. | |

ARCHIE R. BORCHELT, *Primary Examiner.*

M. A. LEAVITT, *Assistant Examiner.*